United States Patent [19]

Tanaka

[11] Patent Number: 4,783,160

[45] Date of Patent: Nov. 8, 1988

[54] STEREOSCOPIC MICROSCOPE

[75] Inventor: Shinya Tanaka, Tokyo, Japan

[73] Assignee: Canon Kabushiki Kaisha, Tokyo, Japan

[21] Appl. No.: 843,569

[22] Filed: Mar. 25, 1986

[30] Foreign Application Priority Data

Mar. 29, 1985 [JP] Japan .................................. 60-67497

[51] Int. Cl.$^4$ ............................................. G02B 21/22
[52] U.S. Cl. ................................... 350/516; 350/508; 350/515; 350/517
[58] Field of Search ......... 350/502, 508, 511, 515–517

[56] References Cited

U.S. PATENT DOCUMENTS

| | | | |
|---|---|---|---|
| 2,737,079 | 3/1956 | Brown et al. | 350/502 |
| 3,909,106 | 9/1975 | Buhler | 350/516 |
| 4,009,526 | 3/1977 | Abe et al. | 350/516 |
| 4,436,384 | 3/1984 | Taira | 350/515 |
| 4,597,644 | 7/1986 | Schindl | 350/511 |
| 4,601,550 | 7/1986 | Yoshino et al. | 350/516 |
| 4,634,241 | 1/1987 | Kohayakawa et al. | 350/516 |

FOREIGN PATENT DOCUMENTS 265485  3/1970  U.S.S.R. ............................. 350/516

*Primary Examiner*—John K. Corbin
*Assistant Examiner*—Martin Lerner
*Attorney, Agent, or Firm*—Fitzpatrick, Cella, Harper & Scinto

[57] ABSTRACT

A stereoscopic microscope is provided with an objective, a pair of relay lens systems having optic axes parallel to each other, a pair of optic axis deflecting prisms for bending the optic axes of the relay lens systems to thereby form a predetermined angle of depression, the prisms being rotatively displaced with respect to the optic axes of the relay lens systems to form a predetermined angle of convergence, and an auxiliary prism cemented to a predetermined reflecting surface of at least one of the pair of optic axis deflecting prisms for forming an optical path different from an optical path leading to a finder system.

8 Claims, 3 Drawing Sheets

STEREOSCOPIC MICROSCOPE

BACKGROUND OF THE INVENTION

1. Field of the Invention

This invention relates to a stereoscopic microscope for use as a microscope for medical operations, and in particular to a stereoscopic microscope having the observation optic axis thereof deflected in the direction of the observer's line of vision.

2. Related Background Art

A conventional stereoscopic microscope having the observation optic axis thereof deflected by about 45° so as to form an angle of depression to facilitate observation will hereinafter be described on the basis of an example of the prior art shown in FIGS. 1 and 2 of the accompanying drawings. This example of the prior art is designed such that a portion E to be examined is stereoscopically observed by the observer O through relay lens systems such as zoom magnification changing optical systems 2L, 2R, overlooking prisms 3L, 3R for deflecting the optic axes by 45° for the formation of an angle of depression and having an image erecting function, eye width adjusting prisms 4L, 4R parallel-moving the optic axes and effecting adjustment of the eye width and eyepieces 5L, 5R (2R, 3R, 4R and 5R not shown) disposed in succession on a pair of parallel left and right optic axes rearward of a common objective 1.

Where an additional instrument such as a view measuring mirror, a camera or a TV camera is mounted on this stereoscopic microscope, beam splitters 6L, 6R (6R not shown) are inserted in the intermediate portion of the observation optical path, that is, between the magnification changing optical systems 2L, 2R and the overlooking prisms 3L, 3R. Thus part of the observation light beam is deflected in a leftward direction substantially orthogonal to the optic axes by the light beam distributing surface 6a thereof. In some cases, these beam splitters 6L, 6R may be disposed in only one of the left and right optical systems.

FIG. 1B is an optical path illustration showing the manner of reflection of the light beam in the overlooking prism 3L. This overlooking prism 3L has effective surfaces 3a, 3b, 3c and 3d, of which the surfaces 3c and 3d provide a 90° roof prism. Accordingly, the light beam from the magnification changing optical system 2L below the overlooking prism 3L enters the lower surface 3a of the overlooking prism 3L and is totally reflected by the surface 3b, whereafter it is totally reflected by the surface 3c, travels toward the surface 3d and is totally reflected by the surface 3a, whereafter it emerges from the surface 3b and is deflected by 45° in a vertical direction with respect to the incident optic axis to the surface 3a. FIG. 1C is a plan view of the overlooking prisms 3L and 3R. Light beams having entered these overlooking prisms from positions corresponding to the magnification changing optical systems 2L and 2R indicated by broken lines are deflected by 45° in a vertical direction by the overlooking prisms 3L and 3R, and enter the eye width adjusting prisms 4L and 4R disposed rearwardly thereof as left and right light beams L and R parallel to each other.

FIG. 2 is a side view of a twice-reflection overlooking prism 3' used instead of a four-times reflection Schmidt prism 3. A light beam having entered the surface 3e of this overlooking prism 3' is totally reflected by the surface 3f thereof and is further totally reflected by the surface 3e and emerges from the surface 3g thereof, whereby it is deflected by 45°. However, this twice-reflection overlooking prism 3' is not a roof prism and has image erecting function. Therefore either the eye width adjusting prism 4 disposed rearwardly thereof must be a prism having an erecting function, such as a poloprism, or an optical system having an erecting function must be inserted into the optical path forward of the overlooking prism 3'.

Thus, in the stereoscopic microscope according to the prior art, light beams entering the eyes of the observer O are parallel to each other and this forces the observer O to assume a state different from the normal naked eye observation state. That is, in the naked eye observation state, the left and right eyes of the observer O have an angle of convergence to see a point, whereas when observation through the microscope is to be effected, convergence must be effected as if said point was at infinity. This makes it difficult for the observer O to effect stereoscopic observation and at the same time, excessively fatigues the observer during observation.

A stereoscopic microscope in which an overlooking prism is rotatively displaced in a plane perpendicular to the optic axis so as to provide a predetermined angle of convergence is proposed in U.S. application Ser. No. 788,785.

However, in these conventional apparatuses, light beam distributing means such as the beam splitters 6L and 6R in FIG. 1 are provided in the observation optical path discretely from the overlooking prisms 3L and 3R so as to form an additional optical path for mounting therein an additional instrument such as a TV camera or other recording apparatus for recording the state of an operation or the like, and this leads to the bulkiness of the apparatus and poor operability of the apparatus. Further, usually, the light beam distributing means are disposed in the observation optical path between the magnification changing optical systems 2L, 2R and the overlooking prisms 3L, 3R and therefore, the apparatus is subject to mechanical limitations, and the direction of deflection of the distributed light beam unavoidably becomes fixed, and this limits the degree of freedom of mounting of the additional instrument.

If overlooking prisms having no image erecting function are used as the overlooking prisms, the image erecting function will have to be performed by other optical member, and for the simplification of the construction of the apparatus, prisms having the image erecting function are desired.

SUMMARY OF THE INVENTION

It is an object of the present invention to provide a stereoscopic microscope in which deflecting means for deflecting the observation optic axis is endowed with a light beam distributing function to thereby enable the observer to obtain a suitable angle of convergence and which has a great degree of freedom of mounting of various additional instruments and is easy to operate.

It is another object of the present invention to provide a stereoscopic microscope in which deflecting means for deflecting the observation optic axis is endowed with an image erecting function to thereby enable the observer to obtain a suitable angle of convergence and which enables an image to be easily seen by a compact construction.

DESCRIPTION OF THE PREFERRED EMBODIMENTS

The invention will hereinafter be described in detail with respect to an embodiment thereof shown in FIGS. 3 to 5.

Figure 1A:
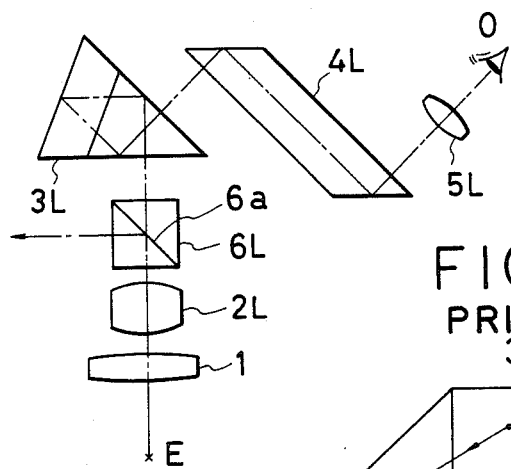
FIG. 1A is a side view of an optical system according to the prior art.
Figure 1B:
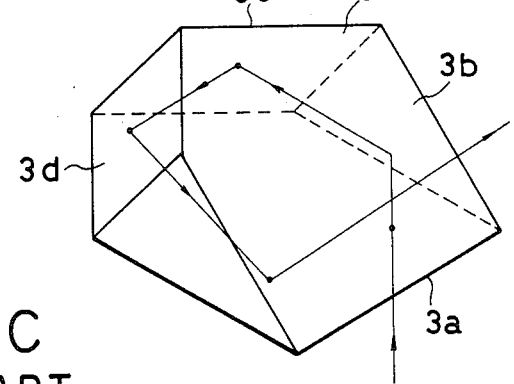
FIG. 1B shows the optical path in an overlooking prism in the optical system of FIG. 1A.
Figure 1C:
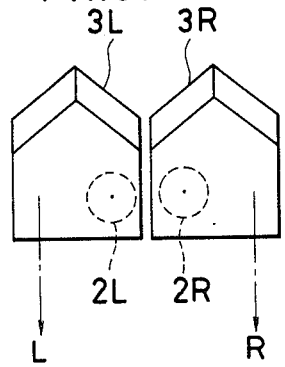
FIG. 1C is a plan view of the essential portion of the optical system of FIG. 1A.
Figure 3:
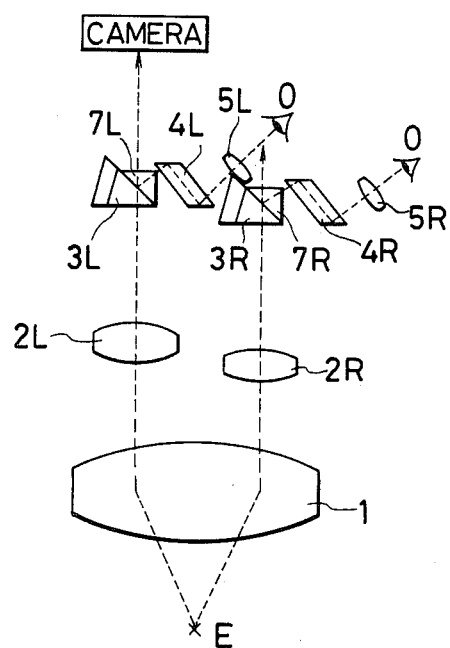
FIG. 3 shows the whole of an embodiment of a stereoscopic microscope according to the present invention.
Figure 4A:
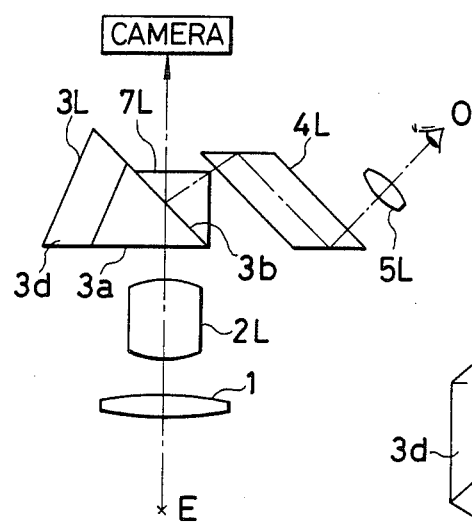
FIG. 4A is a side view of the essential portions of a first embodiment.

FIG. 3 shows the whole of an embodiment of the stereoscopic microscope according to the present invention, and FIG. 4A shows a side view of an optical system. In these figures, reference characters similar to those in FIG. 1 designate similar members.

In FIGS. 3 and 4A, the present embodiment is similar to the example of the prior art except for overlooking prisms and light beam separating means. A portion E to be examined may be stereoscopically observed from an angle of depression of about 45° by an observer O through a common objective 1, relay lens systems such as magnification changing optical systems 2L and 2R disposed on a pair of parallel left and right optic axes above the objective 1, overlooking prisms 3L and 3R comprising rectangular prisms 7L and 7R as auxiliary prisms cemented to a reflecting surface 3b, eye width adjusting prisms 4L and 4R and eyepieces 5L and 5R forming a finder system. As in the previously described example of the prior art, the examiner adjusts the eye width adjusting prisms 4L and 4R in conformity with individual eye width during observation to thereby obtain optimum stereoscopic observation.

Figure 4B:
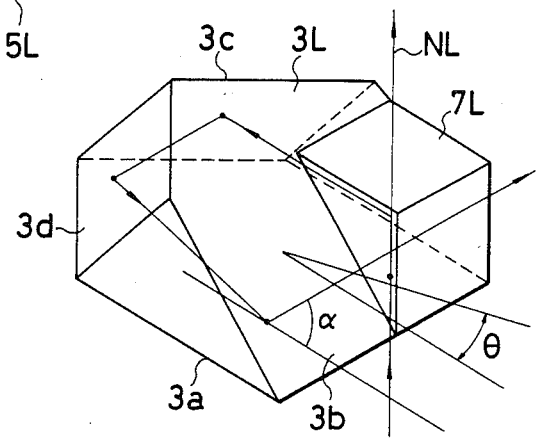
FIG. 4B shows the optical path in an overlooking prism in the first embodiment.

FIG. 4B shows the optical path of the overlooking prism 3L comprising the rectangular prism 7L cemented to the reflecting surface 3b. This overlooking prism 3L is disposed while being rotatively displaced by an angle $\theta$ in a horizontal direction relative to the incident optic axis. That is, the overlooking prism 3L is rotatively displaced by the angle $\theta$ in a horizontal plane from the arrangement of the prior art in which the emergent optic axes of the overlooking prisms 3L and 3R are parallel to each other. A light beam having entered the surface 3a of the overlooking prism 3L is divided into a light beam reflected by the surface 3b to which the rectangular prism 7L is cemented and a light beam rectilinearly travelling and entering the rectangular prism 7L, and the light beam reflected by the reflecting surface 3b is totally reflected by reflecting surfaces 3c, 3d and 3a as in the prior art, is reflected by the surface 3b, is deflected in the direction of the angle of depression of 45° with respect to a vertical optic axis and emerges. The overlooking prism 3L is disposed while being rotatively displaced by $\theta$ about the optic axis of the magnification changing optical system 2L and thus, the light beam deflected by 45° emerges while being inclined by an angle $\theta$ in the horizontal direction relative to the light beam emergent from the overlooking prism 3L in the example of the prior art. Also, the light beam rectilinearly travelling and entering the rectangular prism 7L through the surfaces 3a and 3b directly emerges as a light beam NL from the upper surface of the rectangular prism 7L.

The rectangular prisms 7L and 7R are cemented to the overlooking prisms 3L and 3R so that the upper surfaces thereof are parallel to the lower surface 3a of the overlooking prism 3L. Both of the rectangular prisms 7L and 7R need not always be used, but only one of them may be used.

Figure 4C:
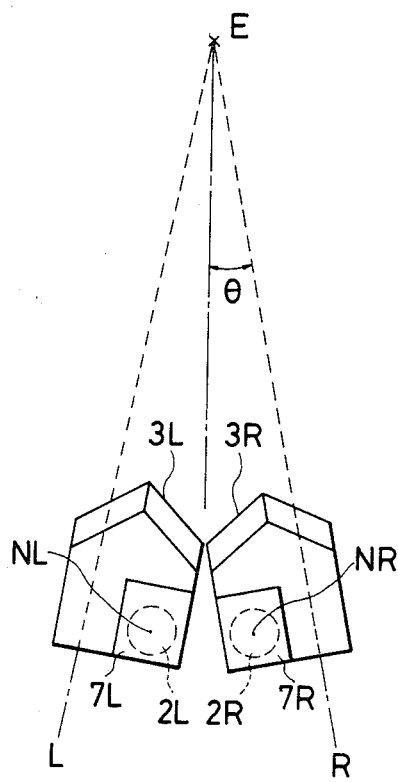
FIG. 4C shows the optical path in the essential portion of the optical system in the first embodiment.

FIG. 4C is a plan view in which the overlooking prisms 3L, 3R and the rectangular prisms 7L, 7R are seen from above and the portion E to be examined is placed at a conjugate position on the extension of the emergent light beam. Since the overlooking prisms 3L and 3R are inclined at an angle $\theta$ in the horizontal direction with respect to the optic axis, the left and right optic axes L and R deflected by the overlooking prisms 3L and 3R intersect each other on the extensions thereof so that the portion E to be examined which is the starting point is common to these optic axes. Accordingly, it is possible to position the portion E to be examined at the range of clear vision to the observer O. Thus, the observer O can stereoscopically observe the portion E to be examined with a suitable angle of convergence. Also, the eye width adjusting prisms 4L and 4R are disposed for rotation about optic axes deflected by optic axis deflecting prisms and parallel-move on the respective optic axes and therefore, the angle of convergence is always constant even if adjustment of the eye width is effected. Accordingly, any examiner can accomplish accurate observation.

The light beams rectilinearly travelling through the above-described overlooking prisms 3L and 3R and upwardly emerging from the rectangular prisms 7L and 7R become left and right parallel light beams NL and NR without being affected by the oblique disposition of the overlooking prisms 3L and 3R, and an additional instrument may be mounted for these light beams NL and NR. By thus removing the light dividing member from the observation optical path, the observation optic axis can be shortened and the operability of the microscope can be improved, and the optical path in which the additional instrument is mounted is not limited by the observation optical system, but the degree of freedom of the mounting of the instrument increases.

Figure 2:
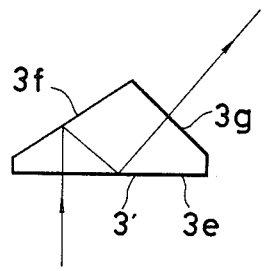
FIG. 2 is a side view of another overlooking prism according to the prior art.
Figure 5:
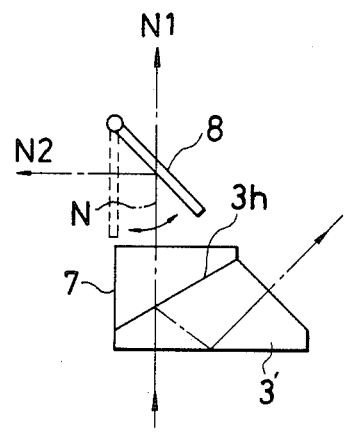
FIG. 5 is a side view of the essential portions of an optical system in another embodiment.

FIG. 5 shows an embodiment in which the twicereflection overlooking prism 3' shown in FIG. 2 is replaced by the previously described overlooking prisms 3L and 3R. In this embodiment, a rectangular prism 7 which is an auxiliary prism is cemented to the surface 3b, and the overlooking prisms 3L and 3R are disposed while being rotatively displaced by an angle $\theta$ relative to the optic axis. The observation light beam is deflected by the overlooking prism 3' as in the prior art, and further, the observer O can accomplish suitable convergence. Also, the light beam rectilinearly travelling upwardly from the surface 3b and entering the rectangular prism 7 emerges upwardly from the rectangular prism 7, and as in the case of the previous embodiment, left and right parallel light beams N are obtained.

In the embodiment shown in FIG. 5, an obliquely disposed mirror 8 is provided above the rectangular prism 7, and by making this mirror changeable over as indicated by broken lines, light beams N1 and N2 can be caused to emerge selectively in different directions and be directed to additional instruments. In this case, the light beam N2 can be made to emerge in a desired direction by the angle of the obliquely disposed mirror 8, and light beams can be made to emerge in a plurality of directions at a time by the use of a light dividing member and the additional instruments can be operated at a time. Again in the case of this embodiment, as in the case of FIG. 2, the overlooking prism 3' has no erecting function and therefore, the erecting function must be performed by other optical system.

Many of ordinary stereoscopic microscopes are such that the direction of the line of vision of the observer O is inclined by 45° with respect to the vertical, but in some cases, the angle of the reflecting surface of the overlooking prism may be suitably changed to any other angle than 45°.

I claim:

1. A stereoscopic microscope comprising:
    an objective;
    a pair of relay lens systems having optic axes parallel to each other;
    a pair of optic axis deflecting prisms for bending the optic axes of said relay lens systems to thereby form a predetermined angle of depression, said prisms being rotatively displaced with respect to the optic axes of said relay lens systems to form a predetermined angle of convergence; and
    an auxiliary prism cemented to a predetermined reflecting surface of at least one of said pair of optic axis deflecting prisms for forming a new optical path different from an optical path leading to a finder system.

2. A stereoscopic microscope according to claim 1, wherein the new optical path formed by said auxiliary prism provides an observation optical path different from said finder system.

3. A stereoscopic microscope according to claim 1, wherein the new optical path formed by said auxiliary prism provides an optical path for a camera or a TV camera.

4. A stereoscopic microscope according to claim 1, wherein said relay lens systems are magnification changing lens systems.

5. A stereoscopic microscope according to claim 1, wherein said optic axis deflecting prisms have an image erecting function.

6. A stereoscopic microscope according to claim 1, further having a pair of eye width adjusting prisms rearwardly of said optic axis deflecting prisms.

7. A stereoscopic microscope comprising:
    an objective;
    a pair of relay lens systems having optic axes parallel to each other;
    a pair of optic axis deflecting prisms for bending the optic axes of said relay lens system to thereby form a predetermined angle of depression, said prisms having an image erecting function and being fixed at a rotated position with respect to the optic axes of said relay lens systems to form a predetermined angle of convergence; and
    a pair of eye width adjusting prisms positioned rearwardly of said pair of optic axis deflecting prisms.

8. A stereoscopic microscope according to claim 7, wherein said relay lens systems are magnification changing lens systems.

* * * * *

UNITED STATES PATENT AND TRADEMARK OFFICE
CERTIFICATE OF CORRECTION

PATENT NO. : 4,783,160

DATED : November 8, 1988

INVENTOR(S) : Shinya Tanaka

It is certified that error appears in the above-identified patent and that said Letters Patent is hereby corrected as shown below:

Column 2, line 3, "has" should read -- has no -- and "Therefore"

should read -- Therefore, --.

Column 4, line 54, "twicere" should read -- twice-re --.

Signed and Sealed this

Fifteenth Day of August, 1989

Attest:

DONALD J. QUIGG

Attesting Officer

Commissioner of Patents and Trademarks